(12) United States Patent
Oshima

(10) Patent No.: US 8,289,554 B2
(45) Date of Patent: Oct. 16, 2012

(54) PRINTING MANAGEMENT APPARATUS AND CONTROL METHOD THEREOF

(75) Inventor: Keita Oshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 455 days.

(21) Appl. No.: 12/610,185

(22) Filed: Oct. 30, 2009

(65) Prior Publication Data

US 2010/0118336 A1    May 13, 2010

(30) Foreign Application Priority Data

Nov. 10, 2008   (JP) ................................. 2008-287945

(51) Int. Cl.
*G06F 3/12* (2006.01)

(52) U.S. Cl. ..................... 358/1.15; 358/1.13; 358/1.16; 358/1.18; 399/81; 400/578; 400/582

(58) Field of Classification Search ................. 358/1.15, 358/1.18, 1.13, 1.16; 399/81; 400/582, 578
See application file for complete search history.

(56) References Cited

U.S. PATENT DOCUMENTS

| 2004/0036916 A1* | 2/2004 | Yamaguchi | 358/1.18 |
| 2007/0086038 A1* | 4/2007 | Matsuzaki | 358/1.13 |
| 2007/0264039 A1* | 11/2007 | Saito et al. | 399/81 |

FOREIGN PATENT DOCUMENTS

JP    2007-299380    11/2007

* cited by examiner

*Primary Examiner* — Marivelisse Santiago Cordero
*Assistant Examiner* — Moustapha Diaby
(74) *Attorney, Agent, or Firm* — Fitzpatrick, Cella, Harper & Scinto

(57) ABSTRACT

Designation of paper and an operator as intended by an MIS while maintaining automation of job processing was not possible, since management of expendables in a POD device and management of performance information by the MIS were not coordinated. In view of this, the MIS acquires usable print sheet information including division management information from the POD device, and, based on a designation of paper designated by a job and a designation of paper associated with an operator relating to the job, selects appropriate paper that the operator is able to use, from the print sheet information provided by the POD device.

15 Claims, 16 Drawing Sheets

FIG. 7

```
1  <PaperList>
2  <Media PaperID="ID0001" Type="Plain" Size="A4" Weight="80" Division="DIVISION 1"/>
3  <Media PaperID="ID0002" Type="Coated" Size="A4" Weight="128" Division="DIVISION 1"/>
4  <Media PaperID="ID0003" Type="Plain" Size="A4" Weight="80" Division="ADMINISTRATION"/>
5  <Media PaperID="ID0004" Type="Recycled" Size="A3" Weight="128" Division="ADMINISTRATION"/>
6  <Media PaperID="ID0005" Type="Recycled" Size="A4" Weight="80" Division="DIVISION 1"/>
7  <Media PaperID="ID0006" Type="Coated" Size="A3" Weight="80" Division="ADMINISTRATION"/>
8  <Media PaperID="ID0007" Type="Plain" Size="A3" Weight="80" Division="ADMINISTRATION"/>
9  <Media PaperID="ID0008" Type="Plain" Size="A3" Weight="80" Division="ADMINISTRATION"/>
10 <Media PaperID="ID0009" Type="Coated" Size="A4" Weight="128" Division="DIVISION 2"/>
11 <Media PaperID="ID0010" Type="Plain" Size="A3" Weight="80" Division="ADMINISTRATION"/>
12 <Media PaperID="ID0011" Type="Plain" Size="A4" Weight="80" Division="ADMINISTRATION"/>
13 <Media PaperID="ID0012" Type="Coated" Size="A4" Weight="128" Division="DIVISION 3"/>
14 <Media PaperID="ID0013" Type="Recycled" Size="A3" Weight="80" Division="ADMINISTRATION"/>
15 <Media PaperID="ID0014" Type="Recycled" Size="A3" Weight="80" Division="ADMINISTRATION"/>
16 </PaperList>
```

FIG. 9

```
1   <JDF>
2     <Device name="Dev E"/>
3     <RunList Filename="input.pdf"/>
4     <LayoutPreparationParams NumberUp="2 2" Sides="TwoSidedFlipX" />
5     <DigitalPrintingParams NumberOfCopies="4"/>
6     <Media Type="Coated" Size="A4"/>
7     <StitchingParams StitchPosition="UpperLeftCorner"/>
8     <Employee Name=" Taro Tanaka " ID="12345"/>
9   </JDF>
```

FIG. 10

```
1   <JDF>
2     <Device name="Dev E"/>
3     <RunList Filename="input.pdf"/>
4     <LayoutPreparationParams NumberUp="2 2" Sides="TwoSidedFlipX" />
5     <DigitalPrintingParams NumberOfCopies="4"/>
6     <Media Type="Coated" Size="A4" PaperID="ID0002"/>
7     <StitchingParams StitchPosition="UpperLeftCorner"/>
8     <Employee Name=" Taro Tanaka " ID="12345"/>
9   </JDF>
```

FIG. 15

```
1  <PaperList>
2  <Media PaperID="ID0002" Type="Coated" Size="A4" Weight="128" Division="DIVISION 1"/>
3  <Media PaperID="ID0009" Type="Coated" Size="A4" Weight="128" Division="DIVISION 2"/>
4  <Media PaperID="ID0012" Type="Coated" Size="A4" Weight="128" Division="DIVISION 3"/>
5  </PaperList>
```

PRINTING MANAGEMENT APPARATUS AND CONTROL METHOD THEREOF

BACKGROUND OF THE INVENTION

1. Field of the Invention

The present invention relates to a printing management apparatus for transmitting a print job to a printing apparatus and recording an execution result of the print job, and to a control method thereof.

2. Description of the Related Art

In the commercial printing industry, there is an active movement toward shorter turnaround times and smaller lot job orders with high added value. The introduction of print-on-demand (hereinafter, POD) devices in addition to offset printing devices and bookbinding and other post-processing devices that have conventionally been used is therefore being actively pursued. One of the effects of POD devices is being able to automatically process a series of processes such as a printing process and post-processing on printed material, based on the job.

Hybrid workflows are constructed in order to effectively introduce POD devices in addition to existing printing devices. In other words, a mixed environment of conventional printing devices and POD devices is constructed. Also, in commercial printing, the connection with a printing system that records job information, such as a Management Information System (hereinafter, MIS) is important for job performance information gathering and cost estimates. A POD device in a hybrid workflow is also similarly connected to the MIS and gathers performance information on the printing process and the like.

Here, when transmitting a job to a POD device, the MIS needs to describe appropriate instructions in a print job ticket and transmit the print job ticket to the POD device, in accordance with a request for obtaining a desired printing result. Here, there exists a technique (Japanese Patent Laid-Open No. 2007-299380) that involves acquiring device information from a device and generating a print job ticket based on the device information, in a system that transmits jobs to devices.

Even within a POD device, user-specific management of expendables (e.g., printing media such as print sheets of paper) is performed for access management efficiency and user friendliness. In other words, management of expendables information and the like that differs from management information in an MIS and is customized for each printing apparatus is performed.

Currently, expendables management customized for each POD device is not coordinated with job designation and performance information management by an MIS. For example, there may be a plurality of different selection candidates (a plurality of different types of print sheets may be registered) even for the same print sheet type. This is because distinctions may be made using parameters particular to a POD device, or there may be a mechanism for performing user-defined print sheet type registration.

As a result, automatic selection of a print sheet type contrary to the intent on the MIS side may be performed on the job receiving side (POD device). Here, this may result in the effects of automation being impaired, even if selection is performed again by the operator after the job is received, from information managed by the POD device.

SUMMARY OF THE INVENTION

The present invention was made in view of the above related art, and solves the above problem caused by the lack of coordination of expendables information management in a printing apparatus, without impairing the effects of printing workflow automation.

In order to solve the above-mentioned problem, the present invention is provided with the following configurations. That is, a printing management apparatus for communicating with a printing apparatus that performs a printing process based on a job, comprises: a receiving unit configured to receive a first job ticket describing an instruction of a job; an acquiring unit configured to acquire, from a printing apparatus designated as a processing target by the first job ticket, medium type list information managed by the printing apparatus; an updating unit configured to edit medium type designation information described in the first job ticket, using print medium information included in the medium type list information acquired by the acquiring unit, and generates a second job ticket; and a transmitting unit configured to transmit the second job ticket to the printing apparatus.

According to the present invention, management information in a management apparatus (MIS) and a printing apparatus can be synchronized in a printing system, while maintaining printing workflow automation.

Further features of the present invention will become apparent from the following description of exemplary embodiments with reference to the attached drawings.

BRIEF DESCRIPTION OF THE DRAWINGS

FIG. 7 shows exemplary print sheet information in the first embodiment.

FIG. 9 shows an exemplary first job ticket.

FIG. 10 shows an exemplary second job ticket.

FIG. 15 shows exemplary print sheet information in the third embodiment.

DESCRIPTION OF THE EMBODIMENTS

First Embodiment

Hereinafter, embodiments of the present invention will be described in detail with reference to the drawings.

Configuration of Entire Printing System

Figure 1:
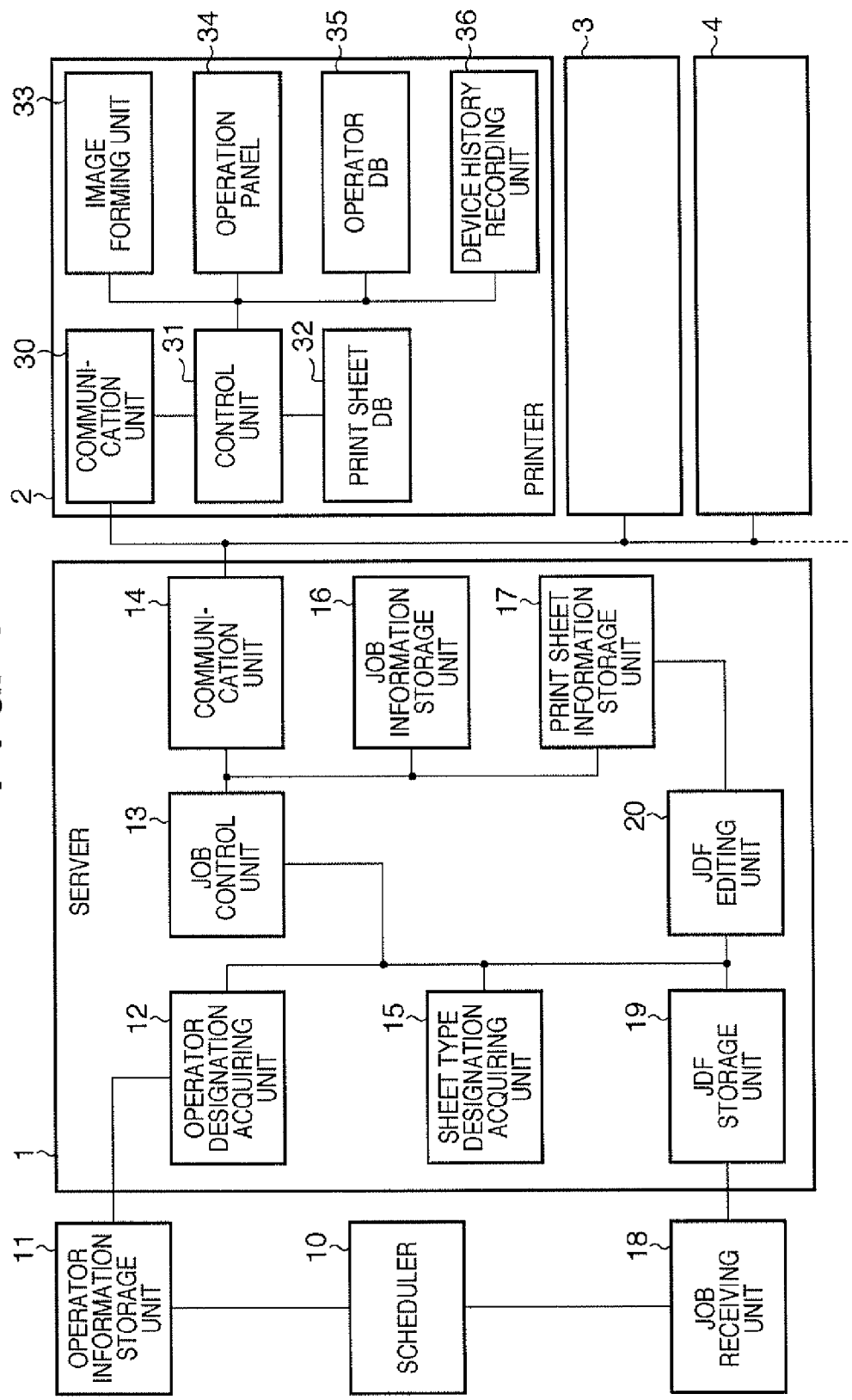
FIG. 1 is a block diagram showing an exemplary configuration of an entire first system.

FIG. 1 is a block diagram showing an exemplary printing system in the present invention. The printing system includes a server 1 and printing apparatuses 2, 3 and 4 connected to the server 1. The server 1 functions as a printing management apparatus.

A scheduler 10, an operator information storage unit 11 and a job receiving unit 18 are external to the server 1, and are respectively realized by a computer in the present embodiment, but may be included in the server 1 and realized as a part of the functions of the server 1.

While the internal block configurations thereof have been omitted, the printing apparatuses 3 and 4 are assumed to have similar functional blocks to the printing apparatus 2.

Also, devices (not shown) other than the printing apparatuses 2, 3 and 4 may be connected to the server 1 in FIG. 1. These devices are also assumed to retain similar functions to the printing apparatus 2. Also, the printing apparatuses may be provided with a configuration for post-processing (binding, stapling, etc.) medium such as a print sheet of paper output by an image forming unit.

Next, the functions of the blocks will be described in accordance with FIG. 1. The server 1 receives a job to be printed by a printing apparatus from the job receiving unit 18. This is a block for receiving a job ticket describing a print request, from an external device such as a Web receiving system connected to a network, for example.

The scheduler 10 manages printing apparatuses and the work schedules of operators thereof, in accordance with information on users, that is, operator information, held in the operator information storage unit 11. The information on users is identification information on users, for example. The job receiving unit 18, upon receiving a print request, acquires information from the scheduler 10, and allocates a printing apparatus and an operator of the printing apparatus. The print request is received as a job ticket (e.g., JDF (Job Definition Format) file). Here, JDF is governed by CIP4 (Cooperation for Integration of Processes in Prepress, Press, and Postpress). A detailed description will be omitted here. Various setting information for the printing process is included in the JDF file, not only information relating to medium such as a print sheet.

The job ticket received from the job receiving unit 18 is held in a JDF storage unit 19. This job ticket is equivalent to a first job ticket. An operator designation acquiring unit 12 analyzes the job ticket held in the JDF storage unit 19, and acquires designated operator information. Also, the operator designation acquiring unit 12 acquires information on the division that the operator designated in the job ticket belongs to, in accordance with the operator information obtained from the job ticket and information from the operator information storage unit 11.

A sheet type designation acquiring unit 15 analyzes the job ticket held in the JDF storage unit 19, and acquires a designated print sheet type. A JDF editing unit 20, having received instructions from a job control unit 13, edits the job ticket, in accordance with the information on the operator, the division to which the operator belongs, and the print sheet type.

The job control unit 13 transmits the job ticket held by the JDF storage unit 19 to the printing apparatus 2, 3 or 4 or the like via a communication unit 14, and input of a job to a printing apparatus is thereby performed. After the input job has ended, the job control unit 13 acquires a record (history) of processing related to the job returned from the printing apparatus via the communication unit 14, and saves the received record to a job information storage unit 16. The operator information obtained from the operator designation acquiring unit 12 is also recorded to the job information storage unit 16 in association with the job.

Further, the job control unit 13 acquires print sheet information from the printing apparatus via the communication unit 14. The acquired print sheet information is saved to a print sheet information storage unit 17. Also, the job control unit 13 appropriately edits the sheet type designation of a job ticket to be transmitted as a job, based on the print sheet information of the printing apparatus saved in the print sheet information storage unit 17, and the print sheet information and operator information recorded in the job ticket held in the JDF storage unit.

The printing apparatus 2 receives input of jobs from outside and inquiries from a server via a communication unit 30. A control unit 31 performs the printing process by controlling an image forming unit 33, in accordance with the job received via the communication unit 30. The history of the printing process is recorded by a device history recording unit 36. Meanwhile, the history of processing related to the job is also transmitted to the server 1, via the communication unit 30.

The operator of the printing apparatus 2, by operating an operation panel 34, registers and logs in the operator that will perform the job processing, or registers the paper to be used in printing. The control unit 31 registers the operator information in an operator database 35, in accordance with an input from the operation panel 34. The control unit 31 similarly registers the input print sheet information in a paper database 32. Operator information and print sheet information are registered in association with one another, and if an operator is specified, for example, print sheet information registered in association with that operator can also be specified. With the print sheet information registered in connection with an operator, apart from information specifying the type of print sheet that the operator is able to use, it is also possible, for example, to register designated paper as the default for that operator, particularly for when executing a job for which paper has not been designated.

Various devices are connected to the server 1. The actions of a printing apparatus connected to the server 1 will be described next.

Operation of Printing Apparatus

Figure 2:
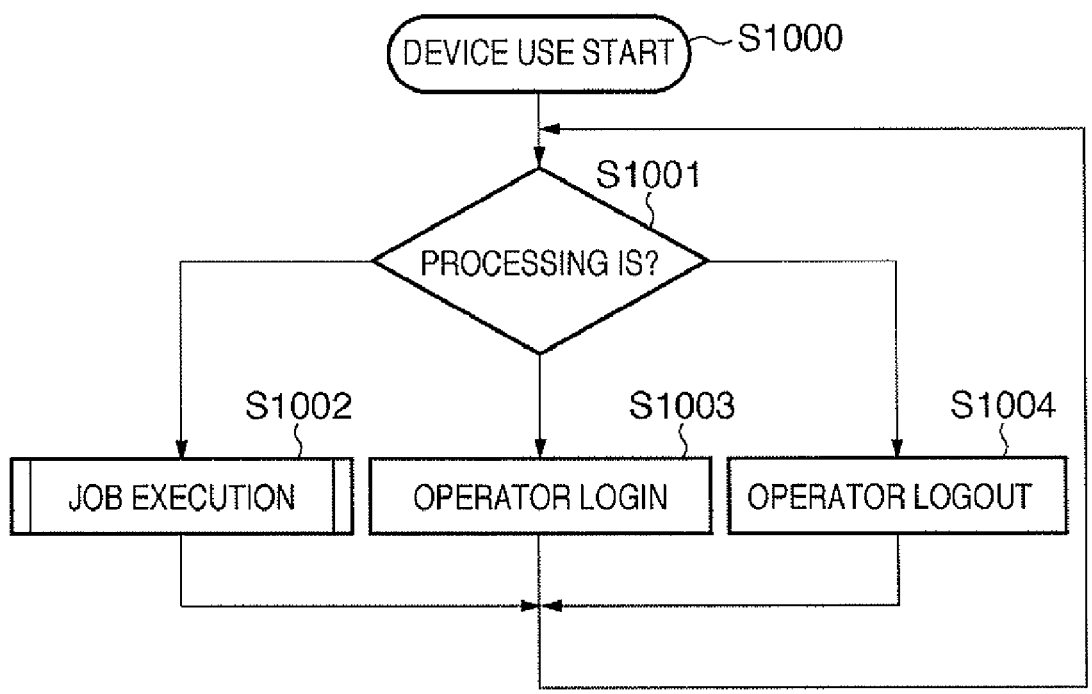
FIG. 2 is a flowchart (1) of print device usage in a first embodiment.

FIG. 2 is an exemplary flowchart showing the flow of a use operation in the printing apparatus 2 in the present invention.

Firstly, in step S1000, use of the device is started. In step S1001, processing is selected. In the case of executing a job, the processing proceeds to step S1002. In the case of logging in an operator, the processing proceeds to step S1003. In the case of logging out an operator, the processing proceeds to step S1004. Selection of processing is performed in accordance with an operation by the operator.

In step S1002, a job is executed.

In step S1003, a login operation performed by the operator using the device is received, and a login process is performed. Here, logging in of the operator using the device is completed by the operator operating the operation panel 34, and inputting a username and a password, or the like.

In step S1004, a process of logging out an operator is performed. Similarly to when logging in, logging out is performed by the operator operating the operation panel 34.

The processing returns to step S1001 when one of the above processes ends, and these processes are repeated.

Figure 3A:
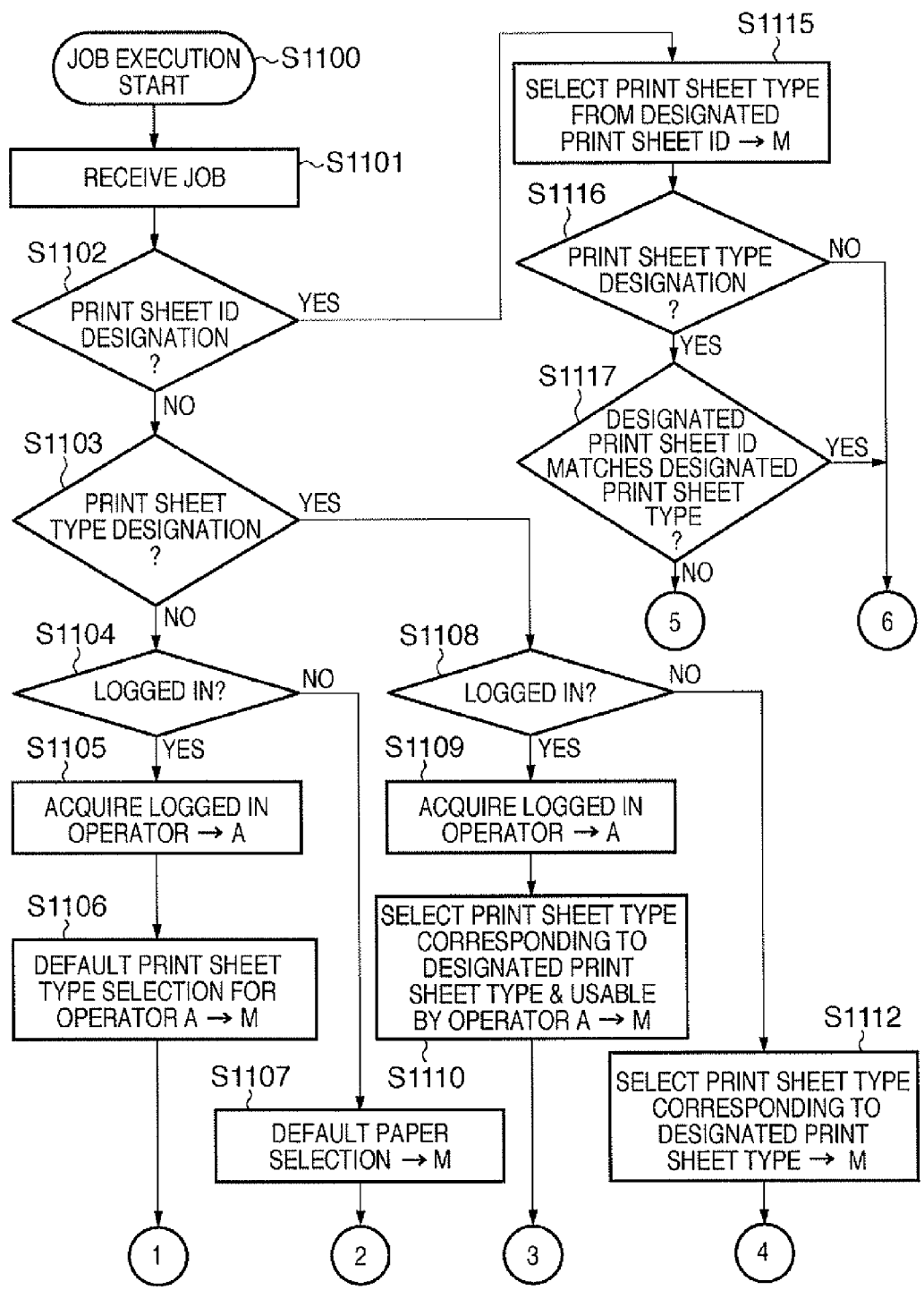
FIG. 3A and FIG. 3B show a flowchart (1) of job execution by a print device in the first embodiment.
Figure 3B:
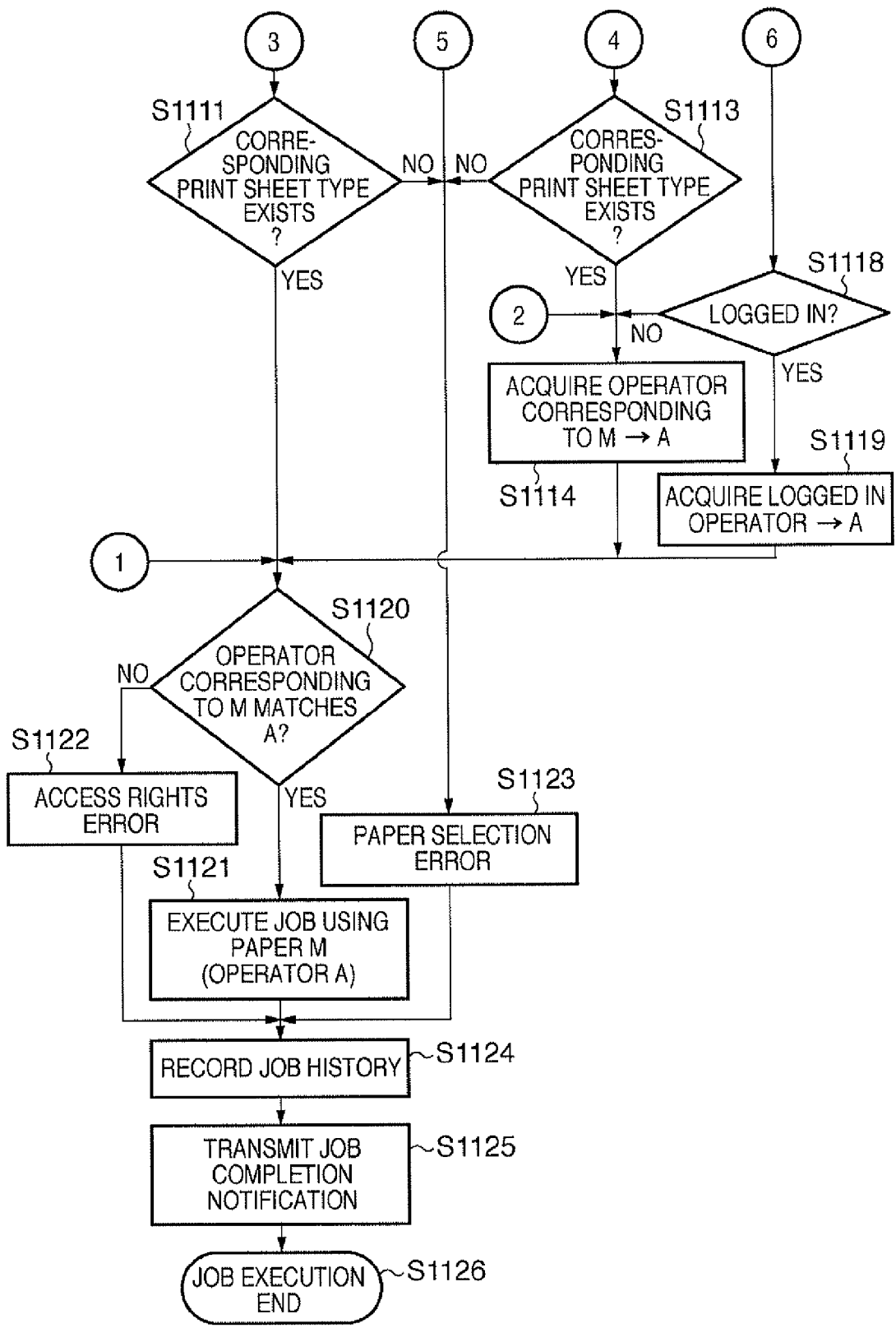

The execution of a job in step S1002 will be described in detail next. FIGS. 3A and 3B show a detailed flowchart of processing related to a job.

Execution of a job is started from step S1100.

In step S1101, the control unit 31 receives a job from the server via the communication unit 30.

In step S1102, it is determined whether there is a designation of print sheet ID in the paper designation in the job received in step S1101. If there is a designation of print sheet ID (Yes), the processing proceeds to step S1115. If there is not a designation of print sheet ID (No), the processing proceeds to step S1103.

In step S1103, it is determined whether there is a print sheet designation by the print sheet type. If there is a designation by the print sheet type, this indicates that the instruction of the job selects paper by the print sheet type rather than ID. In this case (Yes), the processing proceeds to step S1108. If there is not a designation by the print sheet type, this indicates that the instruction of the job does not designate a print sheet type. In this case (No), the processing proceeds to step S1104.

In step S1115, the print sheet type to be used in the job is selected from the paper ID designated by the job. Here, this print sheet type is assumed to be M.

In step S1116, it is determined whether there is a print sheet type designation by the print sheet type. If there is a designation by the print sheet type, this indicates that a print sheet type is designated by both ID and category. In this case (Yes), the processing proceeds to step S1117. If there is not a designation by the print sheet type, this indicates that the instruction of the job selects a print sheet type only by ID. In this case (Yes), the processing proceeds to step S1118.

In step S1117, it is determined whether the designated print sheet ID and the print sheet type match. The control unit 31 acquires the registration content of the designated print sheet ID from the print sheet database 32, and determines whether this matches the designated print sheet type. If matched (Yes), the processing proceeds to step S1118. If not matched (No), the processing proceeds to step S1123, since there is a conflict with the print sheet type designation of the job.

In step S1104, it is determined whether an operator is presently logged into the printing apparatus. If logged in (Yes), the processing proceeds to step S1105. If not logged in (No), the processing proceeds to step S1107.

In step S1105, information on the operator currently logged in is acquired. Here, the operator logged in is assumed to be A.

In step S1106, a designation of default print sheet type associated with the operator A is acquired from the operator database 35, since there is not a designation of print sheet type in the instructions of the job, and this print sheet type is selected as the print sheet type to be used in the job. Here, this print sheet type is assumed to be M.

In step S1107, the default print sheet type of the printing apparatus is selected as the print sheet type to be used in the job, since there is not a designation of print sheet type in the instructions of the job. Here, this print sheet type is assumed to be M.

In step S1108, it is determined whether an operator is currently logged into the printing apparatus. If logged in (Yes), the processing proceeds to step S1109. If not logged in (No), the processing proceeds to step S1112.

In step S1109, information on the operator currently logged in is acquired. Here, the operator logged in is assumed to be A.

In step S1110, a print sheet type corresponding to the designated print sheet type and to the operator A is selected from the print sheet database 32. Here, this print sheet type is assumed to be M.

In step S1111, it is determined whether step S1110 was successful. If a print sheet type corresponding to the conditions could be selected (Yes), the processing proceeds to step S1120. If there was no print sheet type corresponding to the conditions (No), the processing proceeds to step S1123.

In step S1112, the designated print sheet type is selected from the paper database 32. Here, this paper is assumed to be M.

In step S1113, it is determined whether the selection in step S1112 was successful. If the print sheet type corresponding to the conditions could be selected (Yes), the processing proceeds to step S1114. If the print sheet type corresponding to the condition could not be selected (No), the processing proceeds to step S1123.

In step S1114, operator information corresponding to the currently selected print sheet type M is acquired from the print sheet type database 32. Here, this operator is assumed to be A, and the execution operator of the job to be executed at a subsequent step is assumed to be A. This designation is recorded as the operator information of the job history in the printing apparatus.

In step S1118, it is determined whether an operator is currently logged into the printing apparatus. If logged in (Yes), the processing proceeds to step S1119. If not logged in (No), the processing proceeds to step S1114.

In step S1119, information on the operator currently logged in is acquired. Here, the operator logged in is assumed to be A.

In step S1120, operator information corresponding to the currently selected paper M is acquired from the paper database 32. It is then determined whether this operator information matches the operator A that is currently designated. If matched (Yes), the processing proceeds to step S1121. If not matched (No), the processing proceeds to step S1122.

In step S1121, the job is executed. Here, the print sheet type used is M. The job is handled as a job by the operator A.

In step S1122, an access rights error is assumed, since the selected print sheet type is not for the operator processing the job. An access rights error display is output on the operation panel, and the received job is canceled.

In step S1123, a print sheet selection error is assumed, given that the selected print sheet type does not exist, or there is a conflict in the designation of print sheet type. A print sheet type selection error display is output on the operation panel, and the received job is canceled.

In step S1124, the history of the job is recorded in the device history recording unit 36. If the job was processed normally in step S1121, information on the executed job (processing time, page number, content of print settings or post-processing), the print sheet information (M), the operator information (A), and the like are recorded. In the case of an error in step S1122 or step S1123, the fact that the job was cancelled due to an error and the details of the error information are recorded.

Here, information on the operator described in the job ticket may be recorded in the device history recording unit 36, as the user that performed processing of the job. Information can thereby be recorded as the processing history of the job of the operator that is described in the job ticket and performed the actual processing, rather than the user (job owner) that actually input the job in the server 1, for example.

In step S1125, a job completion notification is transmitted via the communication unit 30. Information based on the job history recorded in step S1124 is sent to the server 1. Here, the history information may be described in the job ticket and sent to the server 1.

The printing apparatus that performs the actions shown in the flowchart of FIGS. 3A and 3B is controlled such that the operator associated with the recorded print sheet type matches the operator that actually executes the job using that print sheet type. In other words, if not matched an error occurs, and the job is not executed.

A printing apparatus that performs different actions from this could also be connected to the server 1. Exemplary processing that is, for example, performed by the printing apparatus 3, and differs from the printing apparatus corresponding to FIGS. 3A and 3B, will be shown next.

Figure 4A:
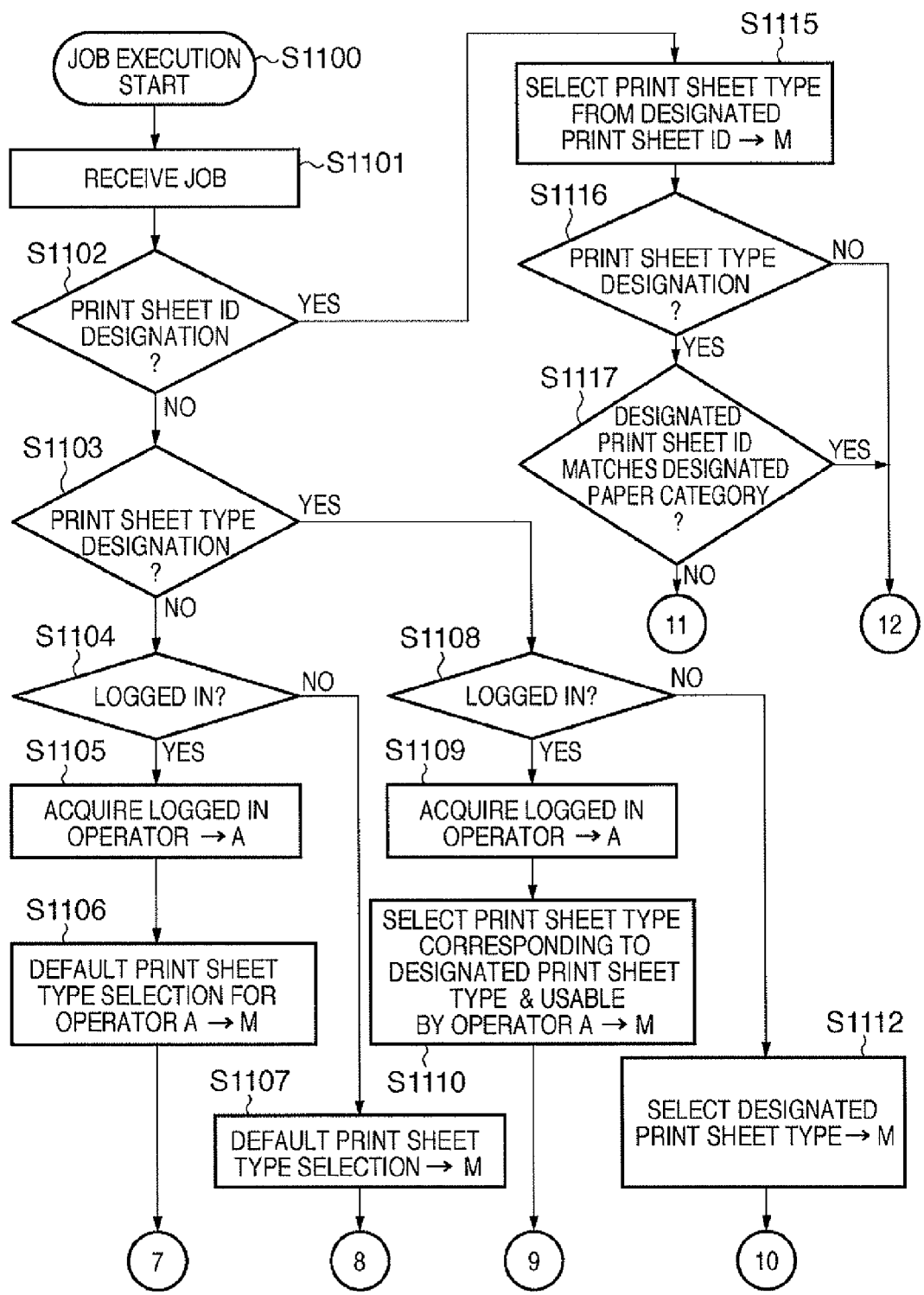
FIG. 4A and FIG. 4B show a flowchart (2) of job execution by a print device in the first embodiment.
Figure 4B:
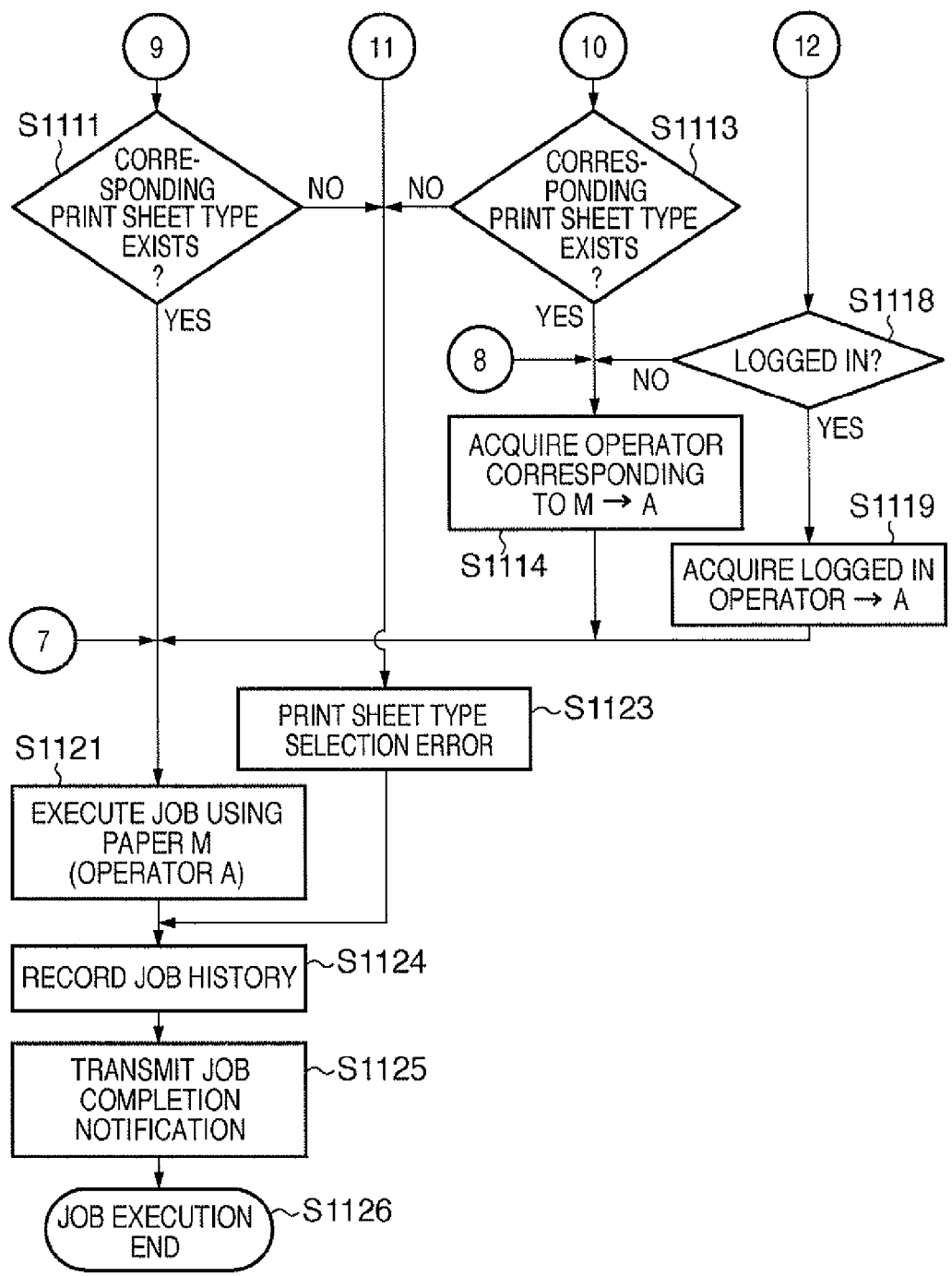

FIGS. 4A and 4B show a detailed flow of processing related to a job, in the printing apparatus 3. In FIGS. 4A and 4B, the same numerals are given to steps for performing the same processing as the flowchart shown in FIGS. 3A and 3B. The portions of FIGS. 4A and 4B that differ from the flowchart of FIGS. 3A and 3B will be described.

In FIGS. 4A and 4B, the processing proceeds to step S1121 following the processing of step S1106, S1114 or S1119. Also, if the print sheet type corresponding to the conditions of step S1110 could be selected in step S1111 (Yes), the processing proceeds to step S1121.

In step S1121, the job is executed. The print sheet type used here is M. Also, the job is handled as a job by the operator A. Here, the job can be executed without the print sheet type M being the print sheet type for the operator A.

In step S1124, the history of the job is recorded in the device history recording unit 36. If the job was processed normally in step S1121, information on the executed job, the print sheet information (M), the operator information (A) and the like are recorded.

The printing apparatus that performs the actions shown in the flowchart of FIGS. 4A and 4B is controlled so as to be able to execute a job even if the operator corresponding to the registered print sheet type does not match the operator that actually uses that print sheet type. Further, one more exemplary processing, performed by the printing apparatus 4, for example, will be shown.

Figure 5:
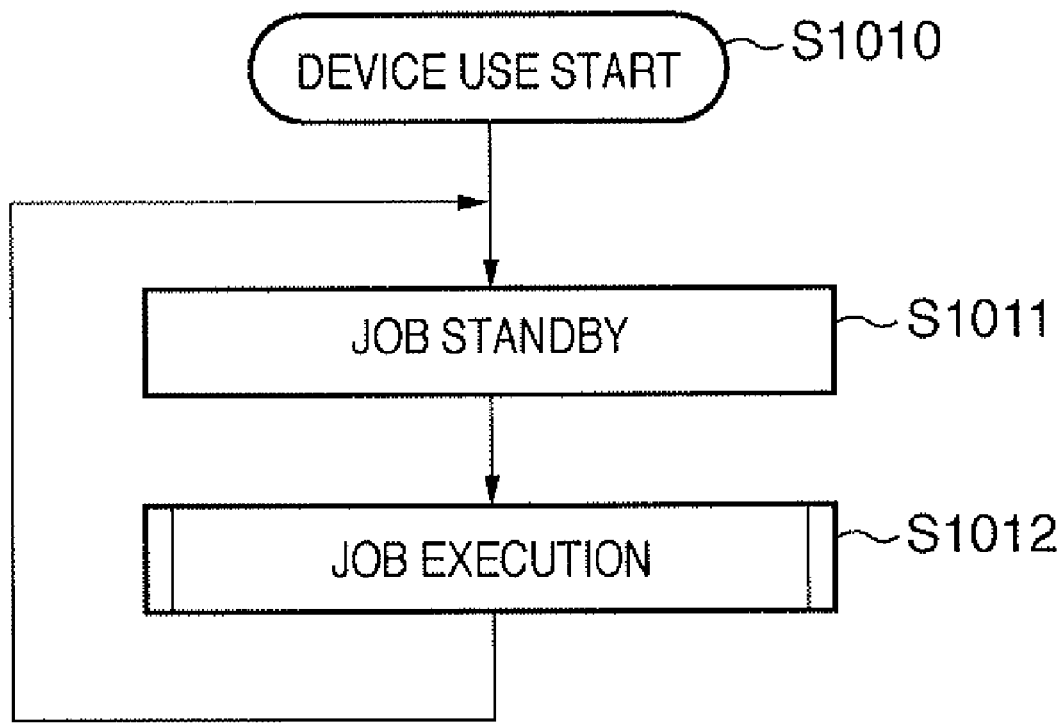
FIG. 5 is a flowchart (2) of print device usage in the first embodiment.

FIG. 5 is an exemplary flowchart showing the flow of use processing of the printing apparatus 4 in the present invention. Firstly, use of the device is started in step S1010.

In step S1011, the device waits for an incoming job.

In step S1012, execution of a job is performed. Once execution of the job has ended, the processing returns to step S1011, and the device waits for the next job.

Figure 6:
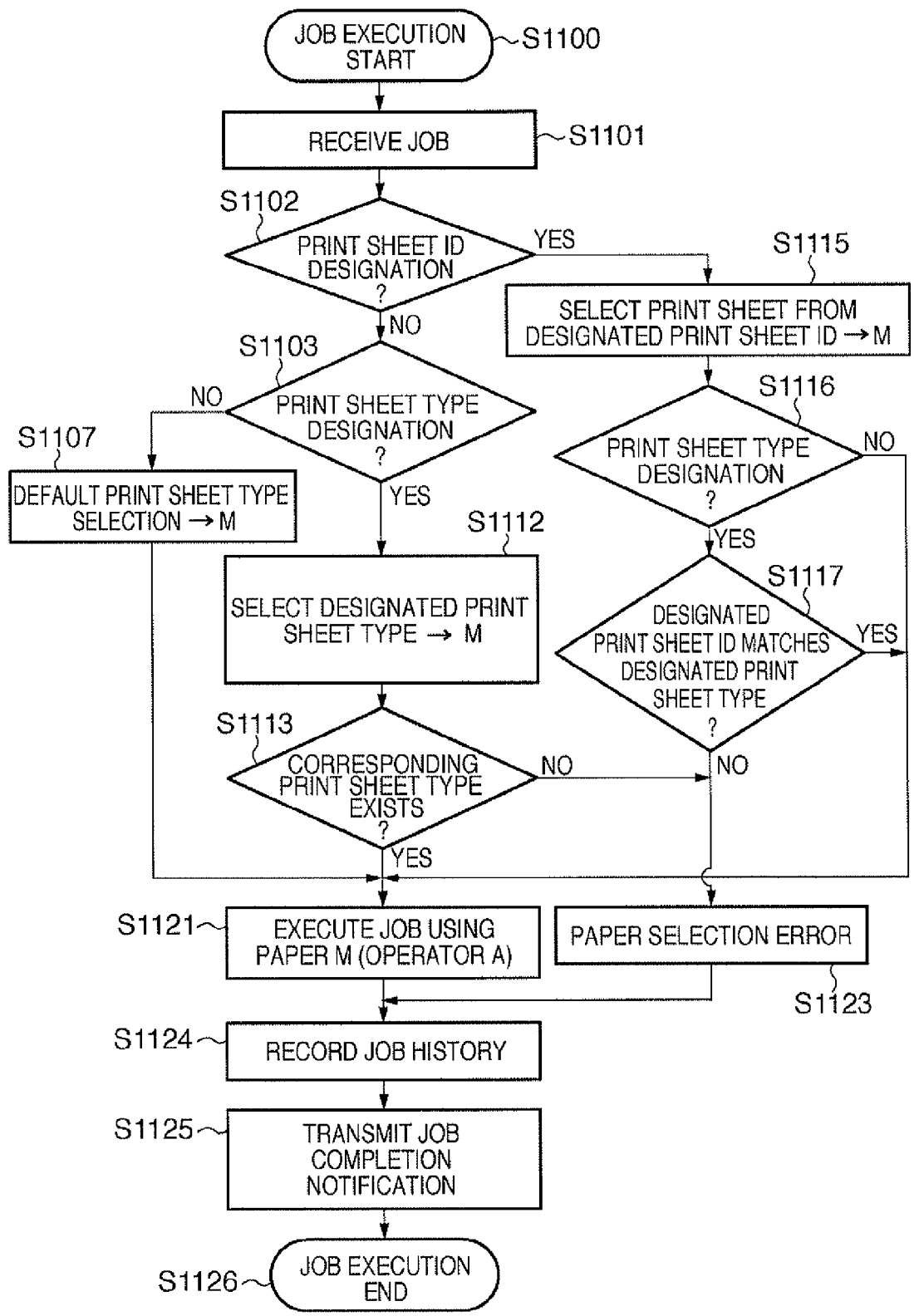
FIG. 6 is a flowchart (3) of job execution by a print device in the first embodiment.

The execution of processing related to a job in step S1012 will be described in detail next. FIG. 6 is a flowchart showing a detailed flow of processing related to a job in the printing apparatus 4. In FIG. 6, the same numerals are given to steps for performing the same processing as the flowchart shown in FIGS. 4A and 4B. The portions of FIG. 6 that differ from the flowchart of FIGS. 4A and 4B will be described.

If there is a designation by the print sheet type (Yes) in step S1103, the processing proceeds to step S1112. If there is not a designation by the print sheet type (No), the processing proceeds to step S1107.

If there is not a designation by the print sheet type in step S1116 (No), and the designated print sheet ID matches the print sheet type designated in step S1117 (Yes), the processing proceeds to step S1121.

The printing apparatus 4 that performs the actions shown by the flowcharts of FIG. 5 and FIG. 6 does not perform an operator login process. For example, when registering a print sheet type, information on an operator that will use this print sheet type can be added, although the printing apparatus is configured to associate operator and print sheet type through operation.

Print Sheet Information Inquiry by Device Information Request

In the present embodiment, the server 1 makes an inquiry for print sheet information to the printing apparatus. FIG. 7 shows exemplary sheet type list information that is returned by the printing apparatus as print sheet types that are usable by the device, in response to a device information request (i.e., inquiry for print sheet information) from the server 1, in the present embodiment.

The data format in the present embodiment takes a text document format using a markup language typified by SGML, XML and the like. Simplified expressions for only required portions are used in the description of the present embodiment, however, and are not strictly in accordance with the specifications of SGML, XML and the like.

The data shown in FIG. 7 consists of 16 lines. <PaperList> of line 1 denotes the start of data description, and </PaperList> of line 16 denotes the end of data description as a corresponding expression. Subsequently, description corresponding to a keyword is similarly performed in the plurality of lines between a keyword line bracketed by "<" and ">" and a keyword line that brackets that same keyword with "</" and ">". This is called a PaperList tag. This format structure is nested, and in a PaperList tag further exist a plurality of Media tags.

The Media tags each show print sheet information registered in the printing apparatus. The description of line 2 will be discussed as an example. This print sheet type has been allocated "ID0001" as the print sheet ID of the print sheet type for registration. The description PaperID="ID0001" corresponds to this. Also, the description Type="Plain" indicates that the quality of this print sheet type is "Plain", that is, plain sheet. The description Size="A4" indicates that the size of this print sheet type is "A4". The description Weight="80" indicates that the weight of this print sheet type is 80 grams per square meter. The description Division="Division 1" indicates that this print sheet type is for use in "Division 1". The print sheet types usable by the device and the identifiers of the users permitted to use these print sheet types are thus described in the print sheet information in association with one another. In FIG. 7, groups such as divisions are described as users, but information specifying individuals as users may, of course, be described. Also, the specification of print sheet type may be performed by designating another print sheet attribute.

As shown in FIGS. 3A, 3B, 4A, 4B and 5, in the case of inputting a job to a printing apparatus, a print sheet type may be designated with a print sheet ID shown in PaperID, or with a print sheet type such as a quality (i.e., "Type"), "Size", "Weight" or the like. Print sheet IDs may differ depending on the individual printing apparatuses, and are thus only valid in the printing apparatus that executes the job. Nevertheless, the print sheet type of a printing apparatus that constitutes the processing target can be uniquely designated by designating a print sheet ID. On the other hand, a print sheet type can be designated independently of the printing apparatus in the case of a designation by print sheet type. However, depending on the printing apparatus, the corresponding print sheet type may not exist, or there may be a plurality of print sheet type candidates. Thus, it is possible that print sheet type cannot be uniquely specified.

Next, the job input procedures in the server 1 to which printing apparatuses such as the above are connected will be described.

Operation of Server

Figure 8:
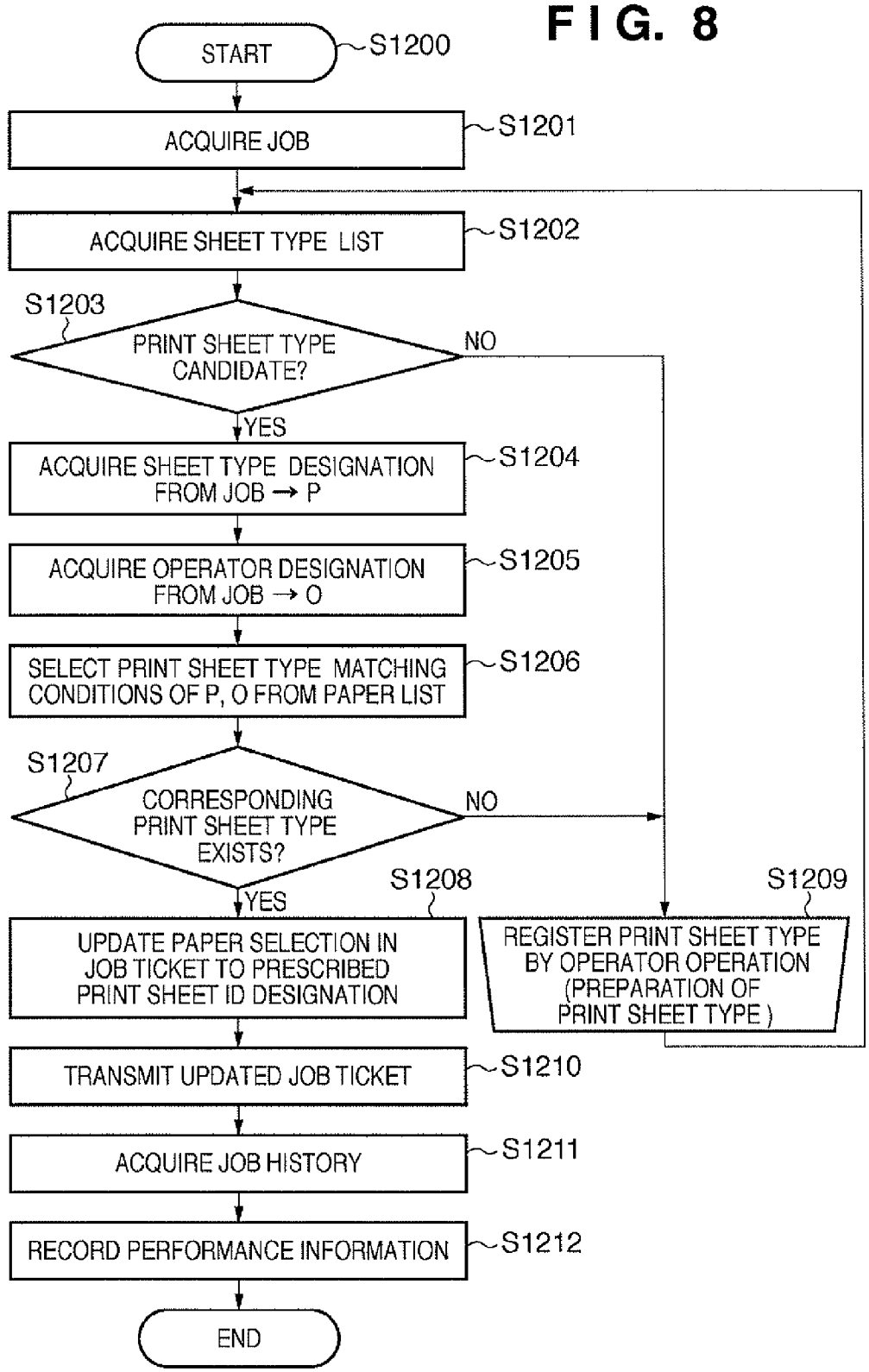
FIG. 8 is a flowchart of a job input process in a server in the first embodiment.

FIG. 8 is an exemplary flowchart showing the flow of a job input process in the server 1 in the present invention.

Firstly, the processing is started in step S1200.

In step S1201, the job control unit 13 acquires a received job ticket from the JDF storage unit 19.

In step S1202, the job control unit 13 issues a device information request to the printing apparatus designated in the job ticket, via the communication unit 14, and requests sheet type list information registered in the printing apparatus. That is, a device information request is firstly issued prior to acquiring device information. The job control unit 13 acquires sheet type list information from the printing apparatus, and saves the acquired sheet type list information to the print sheet information storage unit 17. The information acquired here is, for example, data in a format such as shown in FIG. 7.

In step S1203, the job control unit 13 determines whether one or more pieces of print sheet information are included in the sheet type list information acquired in step S1202. If print sheet information is not included (No), the processing proceeds to step S1209. If print sheet information is included (Yes), the processing proceeds to step S1204.

In step S1204, the sheet type designation acquiring unit 15 analyzes the job ticket read from the JDF storage unit 19, and stores print sheet information designated in the job ticket in a variable P.

In step S1205, the operator designation acquiring unit 12 analyzes the job ticket read from the JDF storage unit 19, and stores operator information and information on the division to which the operator belongs designated in the job ticket in a variable O.

In step S1206, the job control unit 13 selects the print sheet type that matches the conditions from the sheet type list information saved in the print sheet information storage unit 17, based on the print sheet information P and the operator information O that includes division information. The print sheet type and the operator information designated in the server 1 thereby match print sheet information used in the printing apparatus. Print sheet type that matches the conditions denotes, for example, a print sheet type that is associated with the operator in the job ticket, out of the print sheet type included in the paper list information, and that is designated by the print sheet information (i.e., sheet type designation information) P. In the example in FIG. 7, the division to which the operator belongs is firstly specified, since print sheet type is associated with division, and the print sheet type described in the print sheet information associated with that division will be the print sheet type that is associated with the operator in the job ticket. The association between individual operator and division is stored in the operator information storage unit 11 as operator information, for example.

In step S1207, it is determined whether the print sheet type selected in step S1206 exists in the sheet type list information. If the print sheet type exists (Yes), the processing proceeds to step S1208. If the print sheet type does not exist (No), the processing proceeds to step S1209.

In step S1209, the operator of the printing apparatus is prompted to register the print sheet type, since the print sheet type required for the target printing apparatus is not registered as print sheet information. After registering the print sheet information as a result of a manual operation by the operator, the processing returns to step S1202, and the server 1 again performs sheet type list acquisition.

In step S1208, the JDF editing unit 20 edits the print sheet type designation in the job ticket, and updates the print sheet type designation to the print sheet ID designation.

In step S1210, the job control unit 13 transmits the job ticket updated in step S1208 to the printing apparatus via the communication unit 14.

In step S1211, job history information returned from the printing apparatus after the execution of processing based on the job ticket is acquired.

In step S1212, the acquired job history information is recorded to the job information storage unit 16, as job performance information in the server 1. The job performance information can also be called history information recorded by the server.

Next, the data in a job ticket used in the present embodiment will be described. FIG. 9 shows an exemplary job ticket received from the job receiving unit in the present embodiment, and stored in the JDF storage unit 19. The format of the job ticket in the present embodiment uses a markup language, the same as sheet type list information returned by a printing apparatus.

The data shown in FIG. 9 is composed of 9 lines. An instruction to the printing apparatus or an instruction for control in the server 1 is described for each classification, in JDF tags book-ended by line 1 and line 9.

Line 2 designates the printing apparatus to which the job ticket is to be transmitted. Here, the printer "Dev E" is designated as the target printing apparatus. The job control unit 13 of the server 1 performs a sheet type list request and job input to the appropriate printing apparatus, in accordance with this description.

Line 3 designates the target page data to be printed. Here, the page data of the filename "input.pdf" is designated. The job control unit 13 of the server 1 transmits the target page data to the printing apparatus together with the job ticket, in accordance with this description. Also, the printing apparatus prints the target page data in accordance with this description.

Line 4 designates the layout of the print page. The description NumberUp="2 2" designates 4-page imposition on a 2×2 grid. Also, the description Sides="TwoSidedFlipX" designates two-sided printing. The printing apparatus performs printing in the layout designated in accordance with these descriptions.

Line 5 designates a print control of the printing apparatus. The description NumberOfCopies="4" designates outputting four copies as the number of copies.

Line 6 designates the print sheet type to be used in printing. The description Type="Coated" designates coated paper as the print sheet. Also, the description Size="A4" designates A4 as the print sheet size. The printing apparatus performs printing on the print sheet designated in accordance with these descriptions. The procedures for print sheet type selection in a printer are as shown in FIGS. 3A, 3B, 4A, 4B and 6.

Line 7 designates stitching. Here, stitching the upper left corner is designated. The printing apparatus performs the stitching process designated in accordance with this description.

Line 8 shows information on the operator in charge of this job. The server 1 transmits the job to the printing apparatus, and aggregates and manages the job history. The job control unit 13 of the server 1 records the operator information to the job information storage unit 16 together with the job history, in accordance with this description. Here, "Tanaka Taro" is designated as the operator name, and "12345" is designated as the operator ID. Here, the operator shown in FIG. 9 is assumed to belong to "Division 1" in accordance with the information recorded in the operator information storage unit 11.

As described above, the printing apparatus is able to perform the printing process by receiving the job ticket shown in FIG. 9. However, if the designated print sheet type does not exist or is inappropriate, it could happen that not only is the desired printing result unobtainable but the job itself cannot be executed.

Next, an exemplary updated job ticket transmitted to the printing apparatus in step S1210 of FIG. 8 will be shown.

FIG. 10 shows an exemplary job ticket that has been updated (i.e., second job ticket) based on the sheet type list acquired from the printing apparatus, in the present embodiment. FIG. 10 corresponds to the sheet type list information shown in FIG. 7 and the received job ticket shown in FIG. 9. In FIG. 10, line 6 has been updated with respect to FIG. 9.

The JDF editing unit 20 acquires the division (e.g., "Division 1") to which the operator in line 8 (e.g., "Tanaka Taro") belongs from the operator designation acquiring unit 12. Also, appropriate print sheet type is selected from the list shown in FIG. 7, in accordance with the information "Coated" and "A4" of the print sheet type. Here, the print sheet type shown in line 3 of FIG. 7 is appropriate. Accordingly, the designation PaperID="ID0002" is added to line 6 of FIG. 9 as the print sheet ID.

The job ticket thereby appropriately designates the paper in the printing apparatus uniquely.

Configuration of Server PC

Figure 11:
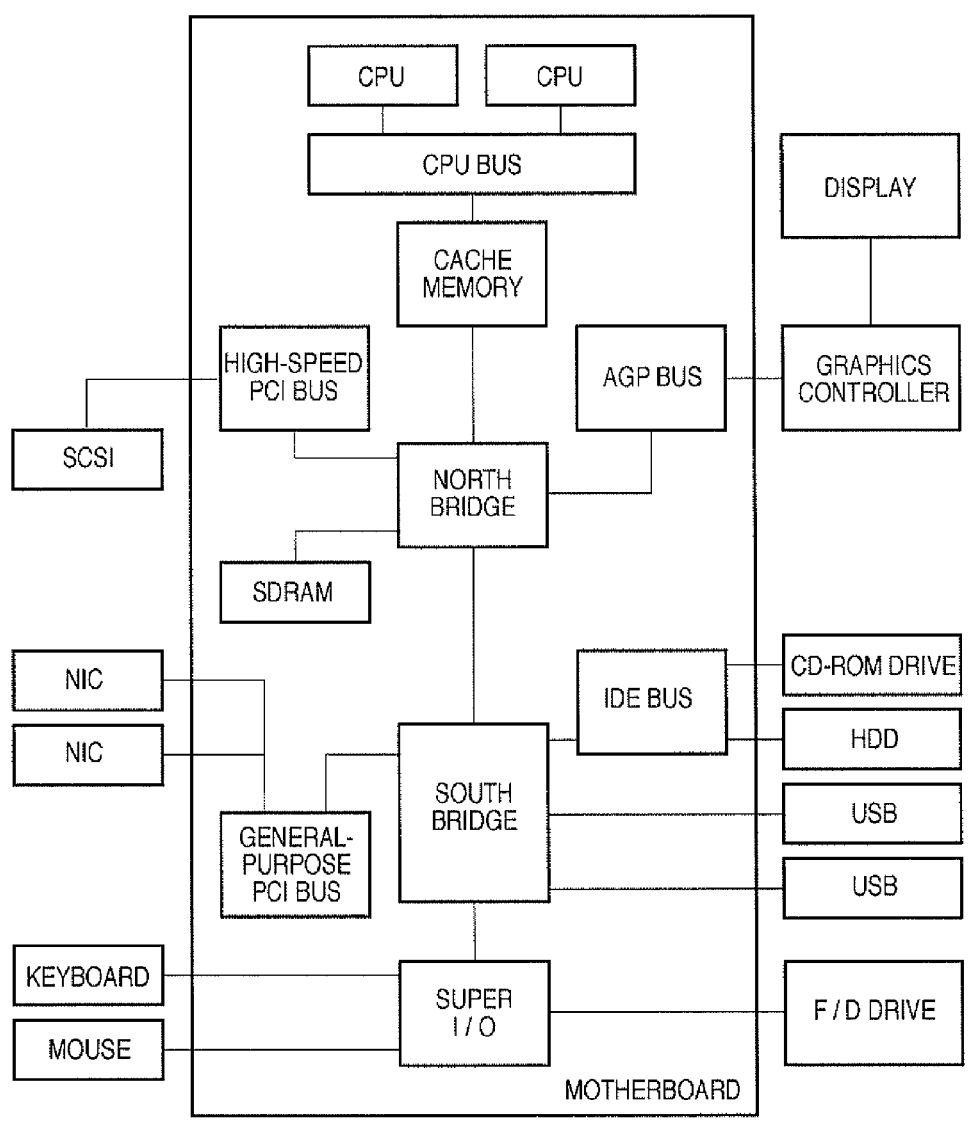
FIG. 11 shows a hardware configuration of a PC.

Finally, a server PC constituting the server 1 will be described using FIG. 11. With the hardware of the server PC, various connection methods and a configuration having various buses and interfaces are commonly known, and the hardware configuration introduced here is merely by way of example.

Firstly, the portion enclosed by the line including CPUs, buses and I/O is a substrate called a motherboard, and functions (described below) are mounted thereon. Two CPUs control the entire software of this server PC, are connected to a cache memory via a CPU bus, and further perform control of the various buses on the motherboard, using LSI chips called a north bridge and a south bridge. A memory such as an SDRAM is used for temporary storage and the like of data in the server PC, including the exchange of data between the north bridge and the south bridge.

Next, the north bridge is a widely known LSI chip that has a high-speed PCI bus compliant with 32-bit/66-MHz specifications, but there are LSI chips that have a faster bus such as PCI Express or PCI-X. Here, the north bridge is able to access an SCSI external apparatus (e.g., hard disk drive for large-volume data), via an SCSI controller and an SCSI interface. Further, a graphics controller for causing a display to perform display is also connected to the north bridge by an AGP bus.

Further, the south bridge has connected thereto a general-purpose PCI bus (32-bit/33-MHz), to which are connected NICs (Network Interface Cards) for Ethernet® or the like. Note that, in FIG. 11, two NICs are connected, having envisaged a case where there are two families of networks, and there may be one NIC in the case of there being one family of networks. However, in the case where a high-speed NIC such a gigabit Ethernet® NIC is used, the high-speed PCI bus on the north bridge side may be used for securing performance. The south bridge also has an IDE bus, and has connected thereto a hard disk drive and a CD-ROM drive, a DVD drive or the like. The hard disk drive stores various data, including control software of the server PC. The CD-ROM drive, DVD drive, or the like, is useful for reading out data when installing software on the server PC and for saving large-volume data (archiving). Also, USB ports enable USB external apparatuses typified by a USB memory to be accessed. Data input-output can also be performed by connecting a keyboard and a mouse, or a flexible disk (FD) drive, via a super I/O unit.

As described above, according to the present embodiment, an appropriate print sheet type that reflects the operator information in the server can be selected. Also, a job for which a print sheet type that reflects the operator information in the server is selected can be automatically processed by the printing apparatus.

As a result, performance information including operator information in the server and expendables and operator (division management) information in the device can be synchronized, while maintaining the effects of automation resulting from a job ticket.

Information can be synchronized in a printing apparatus connected to a server, whatever the case, even if division information corresponding to a print sheet type is managed differently, as follows, for example.

In the case of a printing apparatus that cancels the job when the operator information does not match the print sheet type for selection, print sheet type is selected such that operator information corresponding to the print sheet type matches. Automatic processing will thus not be inhibited.

In the case of a printing apparatus that does not cancel the job even if the operator information does not match the print sheet type for selection, a print sheet type is selected so that there is no conflict between the print sheet type and operator information recorded in the job history.

In the case of a printing apparatus in which the operator information is not recorded in the job history, a print sheet type is selected such that operator information and the print sheet information recorded in the server match operator information associated with the print sheet type recorded in the printing apparatus.

Note that in the present embodiment, the division to which the operator belongs is acquired from the operator information described in the job ticket, in order to establish the correspondence between the print sheet information recorded in the printing apparatus and the division to which the operator belongs. However, directly retaining the division to which the operator belongs in the job ticket, and directly comparing the division with the print sheet information in the printing apparatus is also effective.

Second Embodiment

A second embodiment in the present invention will be described. Since the basic configuration of the second embodiment is the same as the first embodiment, only the differences with the first embodiment will be described.

Figure 12:
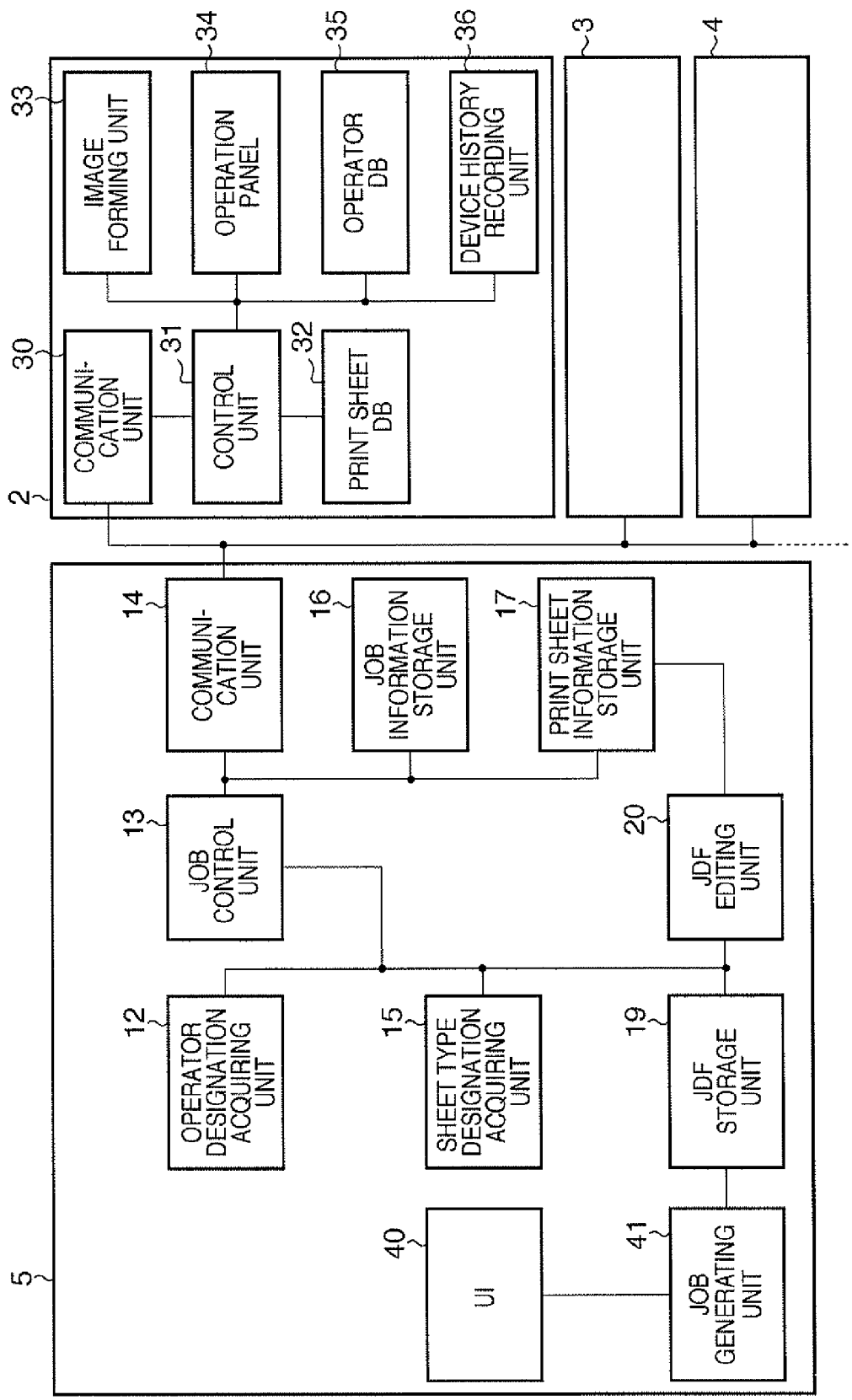
FIG. 12 is a block diagram of a system of a second embodiment.

FIG. 12 is a block diagram in the second embodiment. FIG. 12 corresponds to FIG. 1 in the first embodiment. Also, the same numerals are given to the same blocks as FIG. 1.

In the first embodiment, the server 1 is connected to the external job receiving unit 18 and operator information storage unit 11. In the second embodiment, a printing system 5 has a user interface 40 for receiving jobs. A job is generated by a job generating unit 41, in accordance with the settings and operator information of the job, including a print sheet type designation, input from the user interface 40. The job generated by the job generating unit 41 is stored in a JDF storage unit 19 as a job ticket.

As described above, even with a stand-alone application that generates and issues print jobs, an appropriate print sheet type that reflects operator information input to the application can be selected.

Third Embodiment

A third embodiment in the present invention will be described. Since the basic configuration of the third embodiment is the same as the first embodiment, only the differences with the first embodiment will be described. In the present embodiment, firstly a print job is issued, instead of firstly issuing a device information request prior to acquiring device information as in the first embodiment. If a response indicating job execution failure, such as a print sheet type error, is received from the printing apparatus in response to the print job, the job ticket is updated using print sheet information included in this response.

Figure 13:
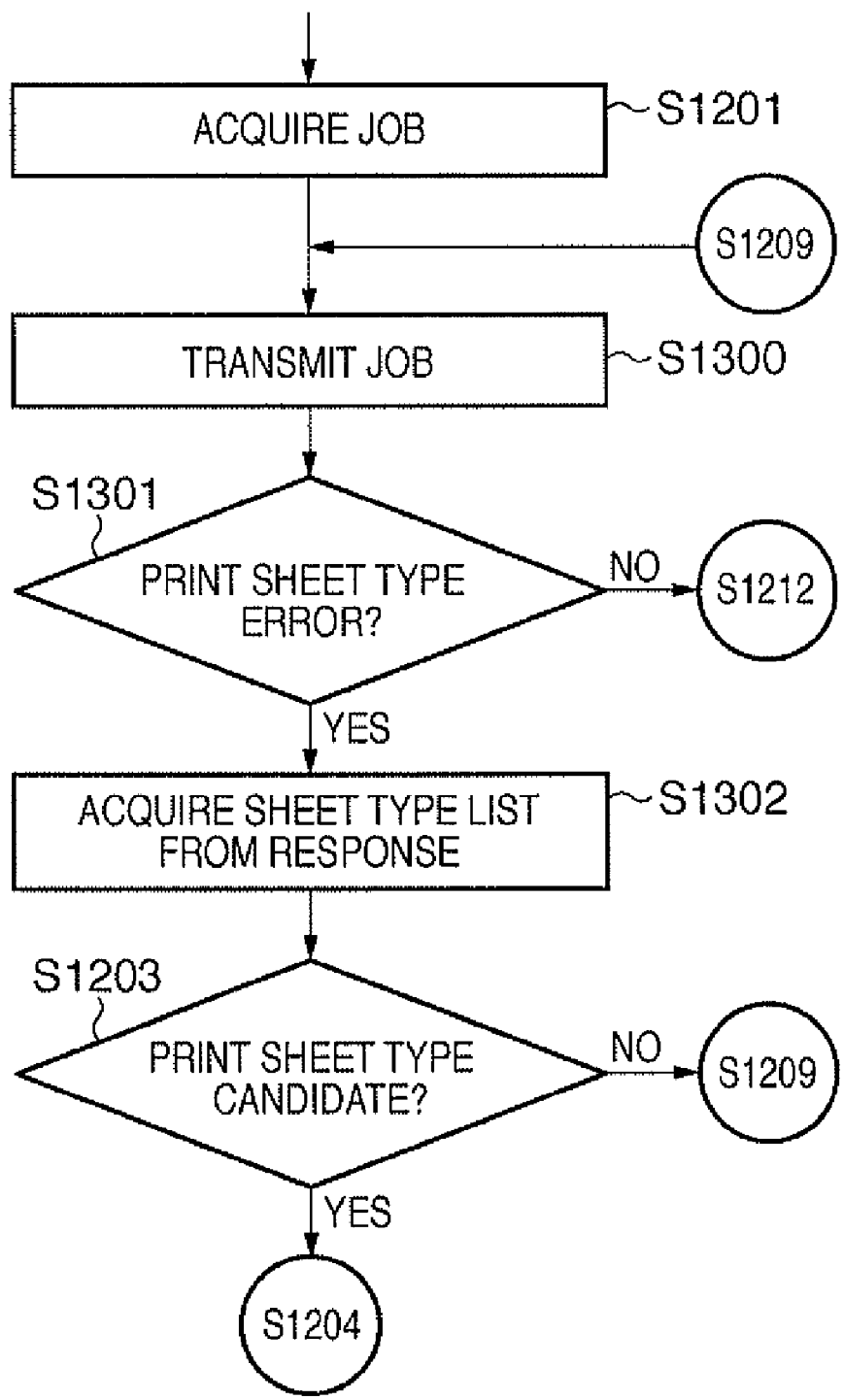
FIG. 13 is a flowchart of a job input process in a server in a third embodiment.

FIG. 13 is a flowchart showing processing in the server 1 in the third embodiment of the present invention. FIG. 13 shows the differences with the flowchart shown in FIG. 8. In FIG. 13, the same numerals are given to the same processing steps as FIG. 8.

In FIG. 13, a job ticket showing a job is acquired in step S1201. At the next step S1300, the job control unit 13 firstly transmits the job ticket directly to the printing apparatus. The printing apparatus processes the job if the job can be executed normally. If the job cannot be executed normally due to a print sheet type error or the like, the printing apparatus returns an error status. Also, in the case where processing cannot be executed due to a print sheet type error, the printing apparatus returns list information of print sheet types corresponding to the job ticket transmitted by the job control unit 13.

In step S1301, the job control unit 13 judges whether the status returned from the printing apparatus is a print sheet type error. If print sheet type error (Yes), the processing proceeds to step S1302. If not print sheet type error (No), or in other word, in the case of normal termination or an error other than a print sheet type error, the processing proceeds to step S1212.

In step S1302, the sheet type list information returned from the printing apparatus is acquired. The processing from step S1203 onward is performed similarly to the first embodiment, with this sheet type list.

Figure 14:
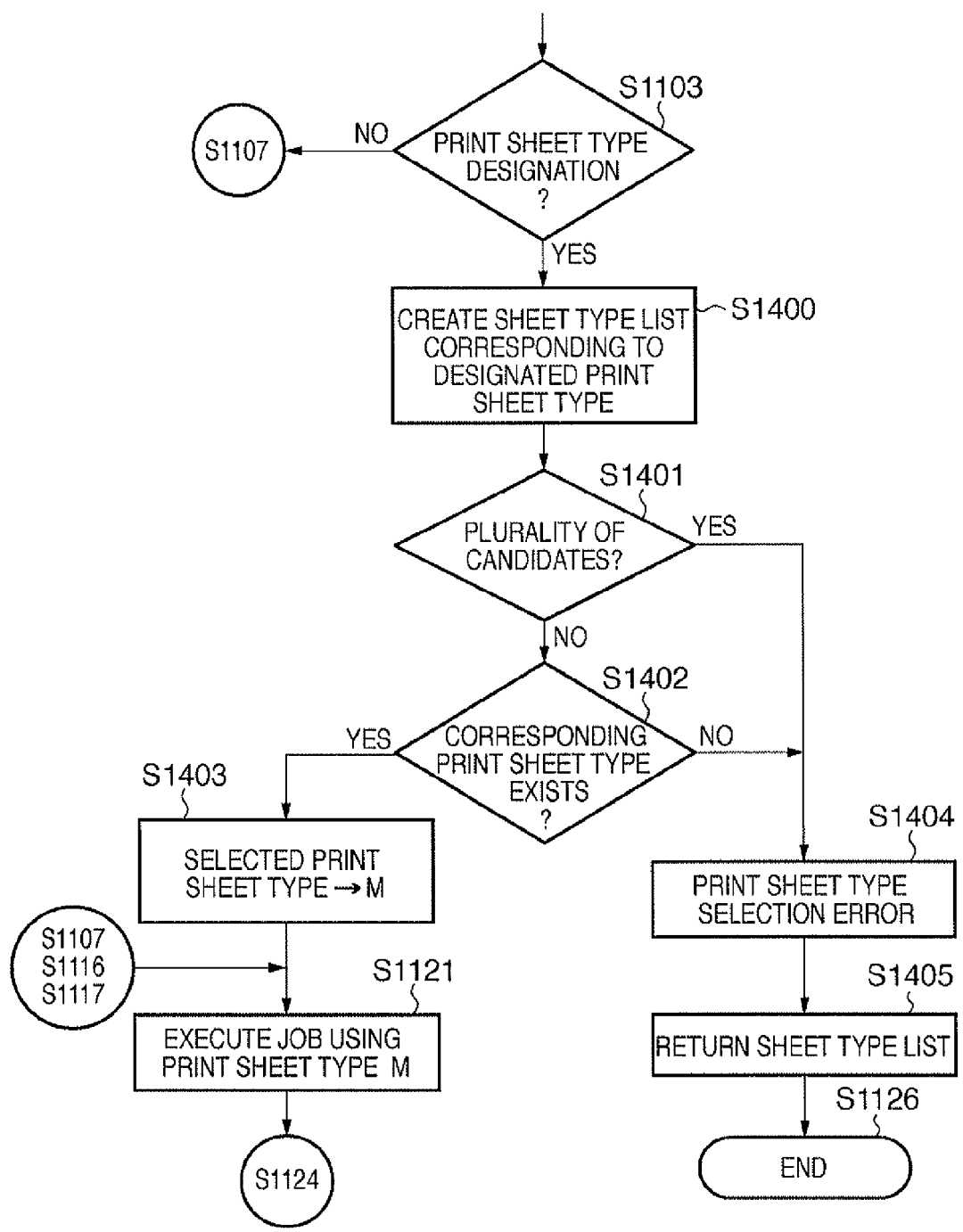
FIG. 14 is a flowchart of job execution by a printing apparatus in the third embodiment.

FIG. 14 is a flowchart showing processing by a printing apparatus in the third embodiment of the present invention. FIG. 14 shows the differences with the flowchart shown in FIG. 6. In FIG. 14, the same numerals are given to the same processing steps as FIG. 6.

In FIG. 14, it is determined in step S1103 whether there is a designation by a print sheet type. If there is a designation by a print sheet type, the control unit 31, at the next step S1400, creates a sheet type list corresponding to the designated print sheet type.

In step S1401, the control unit 31 determines whether there is a plurality of candidates in the sheet type list created at the previous step. If there is a plurality of candidates (Yes), the processing proceeds to step S1404. If there is not a plurality of candidates (No), or in other words, if there is one candidate or no candidates, the processing proceeds to step S1402.

In step S1402, the control unit 31 determines whether there is a candidate in the sheet type list created at a previous step. If corresponding print sheet type exists (Yes), the processing proceeds to step S1403. If corresponding print sheet type does not exist (No), the processing proceeds to step S1404.

In step S1403, the one selected paper is assumed to be M.

In step S1404, a print sheet type error is assumed, given that there is either a plurality of selection candidates or no selection candidates.

In step S1405, the sheet type list created in step S1400 is returned to the server 1 together with a print sheet type error status.

FIG. 15 shows exemplary paper list information returned by a printing apparatus in the third embodiment. The sheet type list information in FIG. 15 corresponds to FIG. 7 in the first embodiment. In the third embodiment, the printing apparatus is assumed to have sheet type list information such as shown in FIG. 7, similarly to the first embodiment. At this time, the sheet type list information shown in FIG. 15 is returned, as a result of transmitting the job ticket shown in FIG. 9 to the printing apparatus that performs the processing shown in FIG. 14. As shown in FIG. 15, three selection candidates of print sheet types are listed.

As described above, the acquired sheet type list can be narrowed down, in the case of transmitting a job to a printing apparatus configured to return a plurality of the selection candidates of print sheet types based on the job ticket initially sent. The printing system can also reduce the amount of data communication that is exchanged, by provisionally transmitting a job, and selecting an appropriate print sheet type based on the information that is returned. Further, this enables the process of selecting an appropriate print sheet type from a sheet type list to be shortened in the printing system.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-287945, filed Nov. 10, 2008 which is hereby incorporated by reference herein in its entirety.

What is claimed is:

1. A printing management apparatus for communicating with a printing apparatus that performs a printing process based on a job, comprising:
   a receiving unit configured to receive a first job ticket describing an instruction of a job;
   an acquiring unit configured to acquire, from a printing apparatus designated as a processing target by the first job ticket, medium type list information managed by the printing apparatus;
   an updating unit configured to edit medium type designation information described in the first job ticket, using print medium information included in the medium type list information acquired by the acquiring unit, and generate a second job ticket;
   a transmitting unit configured to transmit the second job ticket to the printing apparatus; and
   a managing unit configured to acquire and manage performance information on processing, in the printing apparatus, that is based on the second job ticket,
   wherein the performance information is recorded as performance of an operator that operates the printing apparatus designated by the second job ticket.

2. The printing management apparatus according to claim 1, wherein the job ticket is a Job Definition Format (JDF) file.

3. The printing management apparatus according to claim 1,
   wherein the medium list information includes print medium information showing a print medium type usable by the printing apparatus, in association with a user, and
   the updating unit specifies print medium information from the medium type list information, based on a print medium type specified by the medium type designation information described in the first job ticket and identification information of a user described in the first job ticket, and generates the second job ticket by updating the medium type designation information of the first job ticket with the specified print medium information.

4. The printing management apparatus according to claim 1,
wherein the transmitting unit transmits the first job ticket to the printing apparatus, prior to acquisition of medium type list information by the acquiring unit,
if execution of the job fails, the acquiring unit acquires the medium type list information, and
the updating unit generates the second job ticket, based on the acquired medium type list information.

5. The printing management apparatus according to claim 1,
wherein the performance information on processing based on the second job ticket is further described in the second job ticket, and
the managing unit acquires the second job ticket in which the performance information is described from the printing apparatus, and manages the acquired second job ticket.

6. A control method of a printing management apparatus for communicating with a printing apparatus that performs a printing process based on a job, comprising:
a receiving step of receiving a first job ticket describing an instruction of a job;
an acquiring step of acquiring, from a printing apparatus designated as a processing target by the first job ticket, medium type list information managed by the printing apparatus;
an updating step of editing medium type designation information described in the first job ticket, using print medium information included in the medium type list information acquired in the acquiring step, and generating a second job ticket;
a transmitting step of transmitting the second job ticket to the printing apparatus; and
a managing step of acquiring and managing performance information on processing, in the printing apparatus, that is based on the second job ticket,
wherein the performance information is recorded as performance of an operator that operates the printing apparatus designated by the second job ticket.

7. The control method according to claim 6, wherein the job ticket is a JDF file.

8. The control method according to claim 6,
wherein the medium type list information includes print medium information showing a print medium type usable by the printing apparatus, in association with a user, and
in the updating step, print medium information is specified from the medium type list information, based on a print medium type specified by the medium type designation information described in the first job ticket and identification information of a user described in the first job ticket, and the second job ticket is generated by updating the medium type designation information of the first job ticket with the specified print medium information.

9. The control method according to claim 6,
wherein in the transmitting step, the first job ticket is transmitted to the printing apparatus, prior to acquisition of medium type list information in the acquiring step,
if execution of the job fails, the medium type list information is acquired in the acquiring step, and
in the updating step, the second job ticket is generated, based on the acquired medium type list information.

10. The control method according to claim 6,
wherein the performance information on processing based on the second job ticket is further described in the second job ticket, and
in the managing step, the second job ticket in which the performance information is described is acquired from the printing apparatus, and the acquired second job ticket is managed.

11. A non-transitory computer-readable recording medium having recorded thereon a program for causing a computer that communicates with a printing apparatus that performs a printing process based on a job to execute a control method of a printing management apparatus comprising:
a receiving step of receiving a first job ticket describing an instruction of a job;
an acquiring step of acquiring, from a printing apparatus designated as a processing target by the first job ticket, medium type list information managed by the printing apparatus;
an updating step of editing medium type designation information described in the first job ticket, using print medium information included in the medium type list information acquired in the acquiring step, and generating a second job ticket;
a transmitting step of transmitting the second job ticket to the printing apparatus; and
a managing step of acquiring and managing performance information on processing, in the printing apparatus, that is based on the second job ticket,
wherein the performance information is recorded as performance of an operator that operates the printing apparatus designated by the second job ticket.

12. The non-transitory computer-readable recording medium according to claim 11, wherein the job ticket is a JDF file.

13. The non-transitory computer-readable recording medium according to claim 11,
wherein the medium type list information includes print medium information showing a print medium type usable by the printing apparatus, in association with a user, and
in the updating step, print medium information is specified from the medium type list information, based on a print medium type specified by the medium type designation information described in the first job ticket and identification information of a user described in the first job ticket, and the second job ticket is generated by updating the medium type designation information of the first job ticket with the specified print medium information.

14. The non-transitory computer-readable recording medium according to claim 11,
wherein in the transmitting step, the first job ticket is transmitted to the printing apparatus, prior to acquisition of medium type list information in the acquiring step,
if execution of the job fails, the medium type list information is acquired in the acquiring step, and
in the updating step, the second job ticket is generated, based on the acquired medium type list information.

15. The non-transitory computer-readable recording medium according to claim 11,
wherein the performance information on processing based on the second job ticket is further described in the second job ticket, and
in the managing step, the second job ticket in which the performance information is described is acquired from the printing apparatus, and the acquired second job ticket is managed.

* * * * *